United States Patent Office 3,466,284
Patented Sept. 9, 1969

3,466,284
3,4-DIHYDRO QUINAZOLINES AND METHOD FOR PREPARATION THEREOF
Margaret H. Sherlock, Bloomfield, N.J., assignor to Schering Corporation, Bloomfield, N.J., a corporation of New Jersey
No Drawing. Filed Dec. 30, 1965, Ser. No. 517,832
Int. Cl. C07d 51/48; A61k 27/00
U.S. Cl. 260—251                    8 Claims

ABSTRACT OF THE DISCLOSURE

This invention relates to certain substituted 4-phenyl-3,4-dihydroquinazolines, to processes and intermediates useful in the preparation thereof, and to the use of such dihydroquinazolines as valuable anti-inflammatory agents.

---

This invention relates to compositions of matter classified in the art of organic chemistry as substituted 4-phenyl-3,4-dihydroquinazolines and to processes for making and using such compositions.

The invention sought to be patented in one of its composition aspects (hereinafter sometimes referred to as Tangible Embodiment A) resides in the concept of a chemical compound having a molecular structure in which there is attached to a 4-phenyl - 3-,4 - dihydroquinazoline nucleus in the 2-position a member of the group consisting of saturated lower aliphatic hydrocarbon radicals, phenyl-lower alkyl and lower alkoxy methyl, in the 3-positions a member of the group consisting of saturated lower aliphatic hydrocarbon radicals, lower alkenyl, hydroxy-lower alkyl, phenyl-lower alkyl, lower alkanoyl, benzoyl, and in the 4-position a member of the group consisting of H and lower alkyl. Included within this aspect and concept are non-toxic pharmaceutically acceptable acid addition salts and quaternary salts of Tangible Embodiment A.

The invention sought to be patented in another of its composition aspects (hereinafter sometimes referred to as Tangible Embodiment B), resides in a modification of the foregoing concept namely that wherein the nitrogen atom in the 3-position bears hydrogen as a substituent; the chemical compounds resulting therefrom being valuable intermediates for the preparation of the 3-substituted products.

The invention sought to be patented in one of its process aspects resides in the concept of alkylating Tangible Embodiment B in a non-reactive polar non-aqueous solvent in the presence of a strong base by means of the alkylating agent $R_1Z$; $R_1$ being a member of the group consisting of saturated lower aliphatic hydrocarbon radicals and phenyl lower alkyl, and Z is a labile electrophilic group such as bromo, chloro iodo or sulfonic ester.

The invention sought to be patented in another of its process aspects resides in the concept of acylating Tangible Embodiment B with an acid halide or anhydride of a lower alkanoic acid in the presence of an acid receptor.

The invention sought to be patented in still another of its process aspects resides in the concept of reacting a 2-aminobenzhydrol in the presence of a strong mineral acid with the nitrile, RCN, wherein R is a member of the group consisting of saturated lower aliphatic hydrocarbon radicals, and phenyl lower alkyl, until reaction is complete and there is formed Tangible Embodiment B. A variation of the foregoing aspect is that wherein the nitrile is chloro acetonitrile. The Tangible Embodiment B so produced possesses a chloromethyl group at the 2-position. Reaction of said chloromethyl compound with a lower alkanol in the presence of base yields the lower alkoxy methyl embodiment referred to heretofore.

The Tangible Embodiments (A and B) of the composition aspects of the invention possess the inherent general physical properties of being high melting white crystalline solids; are substantially insoluble in water; are soluble in aqueous acid from which solutions the acid addition salts may be obtained on evaporation of water; are soluble in a wide variety of polar and non-polar organic solvents such as ether, alcohol, lower alkyl esters of lower aliphatic acids, aromatic hydrocarbons such as benzene, toluene and the like and chlorinated hydrocarbons such as chloroform.

The Tangible Embodiments A in their free base or acid-addition salt form possess the inherent applied use characteristics of exerting an anti-inflammatory effect as determined by pharmacological evaluation. In addition they exhibit valuable analgesic and antipyretic properties.

As used herein; the term "lower alkyl" means straight and branched chain radicals having up to six carbon atoms, among which are for purposes of illustration but without limiting the generality of the foregoing: methyl, ethyl, propyl, isopropyl, n-butyl, t-butyl, iso amyl and hexyl. The term "lower alkoxy methyl" means lower alkyl as above defined attached to a methylene group through an oxygen bridging atom. The term "hydroxy-lower alkyl" means the aforedescribed lower alkyl groups having at least one hydroxy substituent. Representative of such groups are 2-hydroxyethyl, 3-hydroxypropyl and 2-hydroxypropyl. The term "lower alkenyl" means mono-unsaturated lower alkyl having 3 to 6 carbon atoms of which allyl and methyl allyl are representative. The term "saturated lower aliphatic hydrocarbon" means lower alkyl as above defined and also includes cyclized lower alkyl radicals such as cyclopropyl, cyclobutyl, cyclopentyl and cyclohexyl. The term "lower alkanoyl" denotes the acyl radical of a straight or branched chain lower aliphatic fatty acid having up to about six carbon atoms such as acetyl, propionyl, isobutyryl, caproyl and the like.

Tangible Embodiment A possesses a benzenoid group, a phenyl group at the 4-position, and the substituents R and $R_1$ each includes a phenyl moiety. Each of the aromatic hydrocarbon portions of the molecule may have at least one of its available hydrogen atoms replaced by a nuclear substituent such as lower alkyl, halogen trifluoromethyl or lower alkoxy. The position of these substituents is determined by appropriate selection of starting materials. Thus for purposes of illustration, but not limited thereto, the Tangible Embodiment A, in its free base form, may be represented by the following formula:

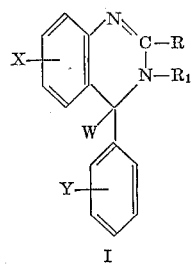

I wherein X and Y are members of the group represented by hydrogen, halogen, trifluoromethyl, lower alkyl, or lower alkoxy; R is a member of the group represented by saturated lower aliphatic hydrocarbon or X-phenyl-lower alkyl, and lower alkoxy methyl and $R_1$ is a member of the group represented by saturated lower aliphatic hydrocarbon, lower alkenyl, hydroxy-lower alkyl, X-phenyl-lower alkyl, and lower alkanoyl and W is a member of the group consisting of H and lower alkyl.

The starting material for the preparation of the tangible embodiments are substituted 2-aminobenzhydrols which can be prepared by hydrogenating the corresponding 2-aminobenzophenone with an agent capable of transforming the carbonyl group to a carbinol. I prefer to utilize sodium borohydride according to conventional methods; however other agents, both chemical and catalytic, are equally useful. The precursors, namely, the appropriately substituted 2-aminobenzophenones, are either well known in the art or may be made by methods readily apparent to one skilled in the art.

According to one procedure, the physical embodiments of my concept are made by first reacting a 2-aminobenzhydrol, (II), bearing the substituent X, with the nitrile, RCN (R being as defined heretofore), in a strong mineral acid, preferably concentrated sulfuric acid. (The reaction product, III, may or may not be isolated.) The reaction is carried out at room temperature or slightly above, while the reaction time determines whether intermediate product III is isolable or transformed in situ into Tangible Embodiment B (IV).

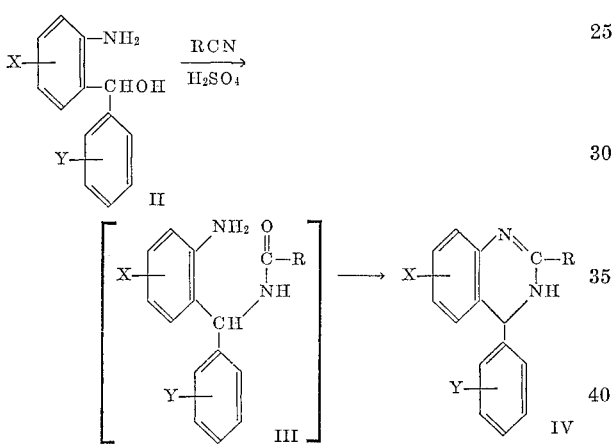

If the reaction in sulfuric acid is allowed to proceed for several hours to overnight, IV is formed in situ and is isolable from the reaction mixture by drowning the mixture in ice and water, rendering the aqueous solution alkaline by means of base (sodium hydroxide or carbonate, for example) whereupon IV precipitates and is removed by filtration. If the reaction is quenched after less than one hour, the principle product isolable is III. Heating III with acid or base effectively transforms it into IV in good yield, however unless III is desirably isolated for other purposes, I prefer to conduct the reaction for several hours so as to insure high production of IV.

In the foregoing reactions the substituent W is hydrogen. In order to have W represent lower alkyl, a 2-aminobenzophenone is reacted with a lower alkyl magnesium chloride (bromide or iodide) in the conventional method for performing a Grignard reaction. The product of such reaction is an α-lower alkyl analog of the 2-aminobenzhydrol II. Preferred compounds are those wherein W is methyl.

Although the reaction scheme shown above, depicting the general reaction known in the art as the Ritter reaction is applicable generally, I prefer to utilize a modification thereof when preparing intermediates showing the structure of IV wherein R represents "lower alkoxy methyl." For this instance, chloroacetonitrile is employed as the nitrile reactant and the product obtained from the reaction is a 2-chloromethyl analog (IVa). When IVa is treated with a lower alkanol, preferably methanol or ethanol in the presence of a base like sodium hydroxide or alkoxide, the corresponding lower alkyl ether (IVb) is obtained. This transformation is shown in the following scheme:

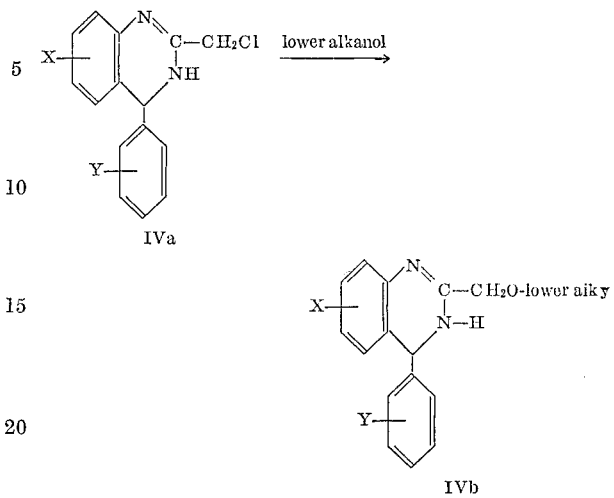

Tangible Embodiment B (IV) is transformable into Tangible Embodiment A (I) by standard alkylation or acylation techniques readily apparent to one skilled in the art. Alkylation of the basic nitrogen atom in the 3-position is effected by treating III, preferably in an inert solvent preferably in the presence of a strong base, with an alkylating agent $R_1Z$ (previously defined), Z preferably being iodide. This transformation is depicted in the following scheme:

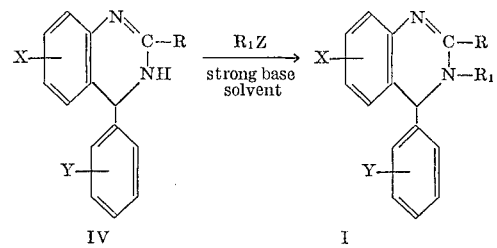

Representative alkylating agents represented by $R_1Z$ are satured by lower aliphatic chlorides, bromides and iodides, the latter preferred, such as methyl iodide, ethyl bromide, ethyl iodide, cyclopentyl bromide (and iodide), cyclopentylmethyl idodide, benzyl chloride, and benzyl iodide. Also useful as alkylating agents are sulfonate esters of $R_1$ such as dimethylsulfate or methyl p-toluenesulfonate.

The alkylation is preferably carried out in an organic solvent which is inert to the reaction. Examples of such solvents are dialkylamide such as dimethylformamide and dimethyl acetamide; aromatic hydrocarbons such as benzene, toluene, xylene, cymene and the like. The strong base represented by sodium hydride may be any strong base soluble or otherwise in the reaction mixtures as represented by sodium methoxide and sodium ethoxide.

An alternate method for arriving at tangible Embodiment A wherein $R_1$ is other than alkanoyl is that depicted by the following scheme:

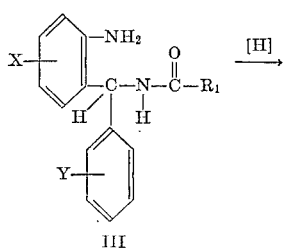

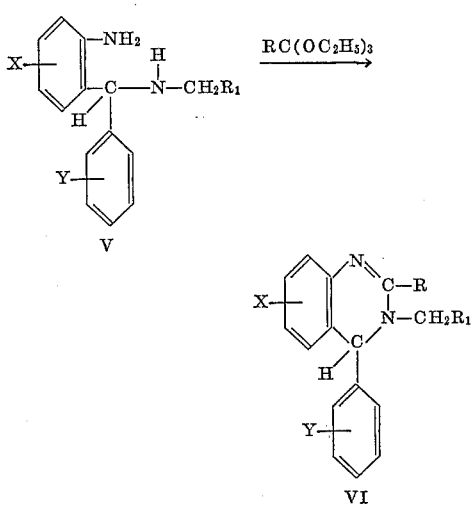

In this sequence, intermediate III is isolated and the amido function hydrogenated so as to produce the secondary amine (V). The hydrogenation is preferably effected by means of lithium aluminum hydride in an inert organic solvent such as dioxane or tetrahydrofuran. Other hydrogenating agents, both chemical and catalytic, known to reduce amides to amines may be used equivalently. Treatment of the amine (V) with an ortho-ester of R-carboxylic acid (R as heretofore defined), at elevated temperatures results in ring closure and formation of VI. The ortho ester is preferably a methyl or ethyl ester although any ortho ester of R-carboxylic acid with a lower alkanol will serve as well. During the course of the ring closure, alkanol (ethanol as depicted) is removed as it is formed to insure the maintenance of elevated temperature (about 145° C.). This alternate method gives rise to VI which is embraced by Tangible Embodiment A.

To prepare compounds of Formula I wherein $R_1$ is lower alkanoyl, Tangible Embodiment (B) (IV) is acylated by conventional means such as by reacting IV with a lower alkanoyl chloride or a hydride in the presence of an acid acceptor such as in pyridine solvent. Representative of such acylating agents are acetyl chloride, propionyl chloride, benzoyl chloride, anhydrides of the corresponding carboxylic acids and the like.

Acid addition salts of the physical embodiments of the invention are prepared by conventional techniques such as evaporating an aqueous solution of the soluble salt. In addition they are prepared by dissolving the base and a moderately strong acid in equimolar quantities in a solvent in which the salt is insoluble and from which it will precipitate. The acids utilizable are those which will give rise to nontoxic pharmaceutically acceptable salts and includes inorganic acids such as hydrochloric, hydrobromic, sulfuric, phosphoric and the like. Organic acids such as maleic, tartaric, citric, tannic for example, likewise may be utilized.

The best mode contemplated for carrying out the invention is set forth as follows.

PREPARATION OF STARTING MATERIALS

Preparation A (a) 2-aminobenzhydrol (II).—To a solution of 0.08 mole of 2-aminobenzophenone in 250 ml. of methanol, add, in portions, 0.16 mole of sodium borohydride while stirring. Reflux the mixture for 30 minutes and then concentrate. Dilute the residue with water and filter. Recrystallize-2-aminobenzhydrol from benzene-hexane.

(b) α-Methyl-2-aminobenzhydrol.—To 0.12 mole of methylmagnesium iodide in 300 ml. of anhydrous ether (prepared in conventional manner from methyl iodide and magnesium metal) while stirring, add slowly a solution of 0.1 mole of 2-aminobenzophenone in 200 ml. of anhydrous ether. Stir and reflux for four hours. Cool and decompose the complex by slow addition of aqueous ammonium chloride. Make the mixture alkaline to litmus paper and separate the ether layer. Wash with water and dry over anhydrous magnesium sulfate. Concentrate to a residue and recrystallize from benzene-hexane to obtain α-methyl-2-aminobenzhydrol.

The foregoing methods describe the preparation of nuclear unsubstituted 2-aminobenzhydrols. By utilizing a 2-aminobenzophenone bearing the nuclear substituent, X or Y the corresponding benzhydrol is produced. When the nuclear subtituent X is present, said X substituent will appear on the benzenoid portion of the quinazoline end product. When the Y substituent is present, it will appear in analogous position on the phenyl group in the 4-position of the quinazoline product.

Preparation B

N - (2-aminobenzhydryl)acetamide (III).—Admix 140 ml. of acetonitrile and 45 ml. of concentrated sulfuric acid. Cool and while stirring add 28.2 g. of 2-aminobenzhydrol (from Preparation A). Stir for 20 minutes and pour onto ice and water. Render alkaline with 50 percent aqueous sodium hydroxide and filter. Recrystallize from benzene-hexene, M.P. 174–175° C.

Preparation C

N - (2-aminobenzhydryl)-N-ethyl amine (V).—Stir a suspension of 10.4 g. of lithium aluminum hydride in 350 ml. of anhydrous tetrahydrofuran and dropwise add a solution of the acetamide of Preparation B in 200 ml. of tetrahydrofuran. Reflux and stir for about 16 hours. Decompose the reaction complex by adding water and then 15 percent aqueous sodium hydroxide. Filter the inorganic salts. Concentrate the filtrate to a residue. Distill the oily residue in vacuo collecting that fraction boiling at 132–133° C. at 0.25 mm.

EXAMPLE 1

2-methyl-4-phenyl-6-chloro-3,4-dihydroquinazoline

Admix 80 ml. of concentrated sulfuric acid with 250 ml. acetonitrile and add 5.0 g. of 2-amino-5-chlorobenzhydrol while stirring and keeping the temperature below 40° C. Stir at room temperature for 24 hours. Pour the mixture onto ice and water and make alkaline with aqueous sodium hydroxide. Filter and recrystallize from acetonitrile, M.P. 214–216° C.

EXAMPLE 2

2,3-dimethyl-4-phenyl-6-chloro-3,4-dihydroquinazoline

Dissolve 13 g. of the compound from Example 1 in 140 ml. anhydrous dimethylformamide and cool the solution to about 5° C. Add 2.7 g. of a 52 percent dispersion of soduim hydride in mineral oil while stirring. After about one hour at 5° C., add 7.9 g. of methyl iodide dropwise, and continue stirring for about 15 minutes. Add one liter of ether and extract the mixture several times with water. Dry the ether layer over anhydrous sodium sulfate, filter and concentrate to a residue. Crystallize from isopropyl acetate, M.P. 163–164° C. Alternatively the compound of this example is prepared as follows: To a hot solution of 1 g. of the compound of Example 1 in 150 ml. of xylene, add 2.5 g. of dimethylsulfate. Reflux for 30 minutes, cool and filter. Recrystallize from ethanol obtaining the methyl sulfonic acid salt of the compound of this example, M.P. 261–263° C. Dissolve the salt in aqueous alkali and extract with ether. Concentrate to a residue obtaining the free base of this example.

A further preparation is as follows: Heat 2 g. of the compound of Example 1 with 2 g. of methyl p-toluenesulfonate at 260° C. The immediate product is the p-toluenesulfonic acid salt of the compound of this example which is converted to the free base as described above.

EXAMPLE 3

2-methyl-3-acetyl-4-phenyl-6-chloro-
3,4-dihydroquinazoline

Dissolve 5 g. of the compound of Example 1 in 100 ml. of pyridine, cool and add 5 ml. of acetyl chloride. Stir for 4 hours, pour into water and filter. Crystallize from aqueous ethanol obtaining the compound of this example.

EXAMPLE 4

2-methyl-3-ethyl-4-phenyl-3,4-dihydroquinazoline

Dissolve 5 g. of the diamine from Preparation C in 17 ml. of triethyl orthoacetate and heat in a metal bath until the internal temperature rises to about 145–150° C. Remove the ethanol as it is formed during the reaction by distillation. Remove the excess ortho ester by concentrating to a residue in vacuo. Crystallize the residue from benzene petroleum ether, M.P. 155–156° C.

EXAMPLE 5

2-methoxymethyl-4-phenyl-6-chloro-
3,4-dihydroquinazoline

To a stirred and cooled solution of 250 ml. of chloroacetonitrile and 60 ml. of concentrated sulfuric acid, add 50 g. of 2-amino-5-chlorobenzhydrol while maintaining the temperature below 40° C. Stir at room temperature for 16 hours. Pour the mixture onto ice water and make alkaline with sodium hydroxide. Extract with methylene chloride. Dry the extracts and concentrate to a residue. Recrystallize from benzene obtaining 2-chloromethyl-4-phenyl-6-chloro-3,4-dihydroquinazoline, M.P. 158–159° C. Reflux a solution of 5 g. of 2-chloromethyl-4-phenyl-6-chloro-3,4-dihydroquinazoline and 5 g. of potassium hydroxide in 200 ml. of methanol for 16 hours. Concentrate in vacuo and dilute with water. Extract with ether and dry the extracts with anhydrous magnesium sulfate. Concentrate to a residue and recrystallize from isopropyl ether, M.P. 142–143° C.

EXAMPLE 6

2-methyl-3-n-butyl-4-phenyl-6-chloro-
3,4-dihydroquinazoline hydrochloride

Prepare 2-methyl-3-n-butyl-4-phenyl-6-chloro-3,4-dihydroquinazoline by the reaction of Example 2 by substituting an equivalent quantity of n-butyl bromide for the methyliodide. After the alkylation and extraction with ether, concentrate the ether solution to a residue. Dissolve the residue in ethanol and add ethanolic hydrogen chloride until the mixture is slightly acid to litmus paper. Add ether to precipitate the hydrochloride of this example. Recrystallize from ethanol ether, M.P. 234–235.5° C.

EXAMPLE 7

2,3,3-trimethyl-4-phenyl-3,4-dihydroquinazoliniumiodide

Reflux 1.7 g. of 2,3-dimethyl-4-phenyl-3,4-dihydroquinazoline, prepared according to the method of Examples 1 and 2, with excess methyliodide. Concentrate to a residue and recrystallize from methanol ether obtaining the quaternary salt of this example, M.P. 239–240° C.

From the foregoing preparations and examples it will be readily apparent to one skilled in the art that by simple variation of the reactants, the various physical embodiments of this invention are prepared. To obtain quinazolines having nuclear substituents X and Y, the appropriately substituted 2-amino benzhydrol is utilized. Representative of such compounds are the following: X-substituted-2-aminobenzhydrols wherein X represents: 3-Cl, 4-Cl, 5-Cl, 6-Cl, 3-Br, 4-Br, 5-Br, 6-Br, 3-F, 4-F, 5-F, 6-F, 3-methyl, 4-methyl, 5-methyl, 6-methyl, 3-methoxy, 4-methoxy, 5-methoxy, 6-methoxy, 3-trifluoromethyl, 4-trifluoromethyl, 5-trifluoromethyl, 6-trifluoromethyl, 3-iodo, 4-iodo, 5-iodo, 6-iodo, 6-ethoxy, 6-ethyl. Further X represents any of the foregoing substituents in either of the 2', 3' or 4' positions. Thus the starting 2-aminobenzhydrol may have at least one substituent in each of its rings. It is obvious that multiple substitution in any one ring is dependent solely upon the nature of the precursors. Quinazoline end products having such multiple substituents are considered to be the equivalent of the mono substituted or unsubstituted quinazoline insofar as their biological properties differ by no more than in degree. By virtue of the easy variability of the starting materials, similar variability in species of end products is manifest. It is to be understood that when the substituent X appears in any intermediate or end product, it simultaneously designates any of its possibilities as variants. Thus certain advantageously used 2-aminobenzhydrols are for example 5-chloro-2-aminobenzhydrol or 5-chloro-2'-fluoro-2-aminobenzhydrol or 3-chloro-4'-methoxy-2-aminobenzhydrol and the like.

The substituent R is determined by the species of nitrile employed as in Example 1, for example, when acetonitrile is used, then R is methyl, when propionitrile is used, then R is ethyl, when phenylacetonitrile then R is benzyl. Representative nitriles are acetonitrile, chloroacetonitrile, propionitrile, butyronitrile, benzonitrile, phenylacetonitrile. When R contains a phenyl group, such as in phenylacetonitrile, said phenyl group may also bear substituent X as defined heretofore.

The following are representative of Tangible Embodiments B produced by the methods set forth in the appropriate examples. Representative compounds are given together with their melting point and crystallization solvent. The nature of the starting benzhydrol and nitrile reactant will be apparent to one skilled in the art from an examination of the quinazoline produced:

| 4-phenyl-3,4-dihydroquinazoline | M.P. (deg.) | Solvent |
| --- | --- | --- |
| 2-methyl | 168–170 | Benzene. |
| 2-methyl/hydrochloride | 310–312 | Ethanol. |
| 2-chloromethyl | 160–161 | Benzene-hexane. |
| 2-chloromethyl/hydrochloride | 251–252 | Ethanol-ether. |
| 2-methyl-6-chloro/hydrochloride | 329–330 | Ethanol. |
| 2-chloromethyl-6-chloro/hydrochloride | 278–279 | Ethanol-ether. |
| 2-benzyl-6-chloro | 181–182 | Benzene-hexane. |
| 2-ethyl-6-chloro | 163–164 | Acetonitrile. |
| 2-benzyl | 145–147 | Benzene-hexane. |
| 2-(4-chlorobenzyl)-6-chloro | 211–212 | Acetonitrile. |
| 2-(2-phenethyl)-6-chloro | 180–181 | Do. |
| 2-(2-phenethyl) | 145–146 | Do. |
| 2,4-dimethyl-6-chloro | 183–184 | Do. |
| 2,6,7-trimethyl | 141–142 | Isopropyl ether. |
| 2,6-dimethyl | 169–170 | Isopropyl acetate. |

The substituent $R_1$ is determined by the species of alkylating agent employed as in Example 2. Representative agents are methyl iodide, dimethylsulfate, methyl p-toluenesulfonate, ethyl iodide, butyl iodide, benzyl chloride, phenethyl iodide, allyl bromide, 2-methylallyl bromide and the like. When $R_1$ contains a phenyl group, such as in benzyl chloride, said phenyl group may also bear substituent X as defined heretofore.

When $R_1$ represents hydroxy alkyl, the quinazoline intermediate bearing hydrogen at the 3-position is reacted with a reagent such as ethylene oxide, propylene oxide, alkylene chlorohydrins like ethylene chlorohydrin, propylene chlorohydrin (1,2 or 1,3). This reaction is carried out in the manner fully described in the art for preparing such hydroxy alkyl derivatives of amino nitrogen atoms.

The following are representative of Tangible Embodiment A produced by the methods set forth in the appropriate examples and elsewhere in the specification:

| 4-phenyl-3,4-dihydroquinazoline | M.P. (deg.) | Crystallization solvent |
|---|---|---|
| 2,3-dimethyl | 181–182 | Isopropyl acetate. |
| 2-methyl-3-acetyl | 120–121 | Hexane. |
| 2-methyl-3-ethyl-6-chloro | 151–152 | Isopropyl acetate. |
| 2-ethyl-3-methyl-6-chloro | 139–140 | Acetonitrile. |
| 2-benzyl-3-ethyl-6-chloro | 145–146 | Isopropyl ether. |
| 2-methyl-3-benzyl | 146–147 | Isopropyl acetate-hexane. |
| 2-methyl-3-benzyl-6-chloro | 141–144 | Do. |
| 2-(4-chlorobenzyl)-3-methyl-6-chloro-hydrochloride as hydrate | 263–265 | Ethanol. |
| 2-methyl-3-allyl-6-chloro | 107–109 | Isopropyl ether. |
| 2-(2-phenethyl)-3-methyl | 136–139 | Isopropyl acetate. |
| 2-methoxymethyl-3-methyl-6-chloro | 130–133 | Do. |
| 2-methyl-3(2-hydroxyethyl)-6-chloro | 181–183 | Do. |
| 2,3,4-trimethyl-6-chloro | 122–124 | Isopropyl ether. |

The tangible embodiments of this invention possess valuable anti-inflammatory and anti-depressant properties as determined by tests in animals. They possess a very favorable ratio of therapeutic dose to toxic dose. These compounds, being non-steroidal, do not simultaneously elicit the hormonal side effects commonly associated with adrenocortical hormones and thus may be used in treating inflammatory conditions where steroid therapy is contraindicated. In addition, these compounds provide a reference point for conducting and comparing additional animal testing of other non-related on-steroid anti-inflammatory agents. They appear to have a favorable therapeutic index in comparison with other non-steroidal anti-inflammatory agents. The novel compounds exhibit valuable antipyretic and analgesic properties. The tangible embodiments exert a stimulating effect as determined by standard evaluation in reversing the effect of tetrabenzine. In view of their anti-pyretic properties, these compounds appear to be of a different nature than the amphetamine stimulants.

The free bases of the tangible embodiments and their non-toxic acid addition salts are preferably administered to the test animal or patient via the oral route and as such are formulated into tablets, capsules, elixirs and syrups containing the usual excipients for such dosage forms. They may also be administered parentally in the form of sterile solutions and aqueous or non-aqueous suspensions. The therapeutic dose is dependent upon the size of the mammalian host and the severity of the condition being treated. For oral administration, a dose in the range of about 0.25 to 5 mg./kg. body weight given twice daily elicits a therapeutic effect. Parenterally, via the intramuscular route, a dose range of about 0.25 to 2.5 mg./kg. of body weight is effective on a daily basis.

The quarternary salts of the tangible embodiments of this invention, as non-toxic pharmaceutically acceptable salts, are CNS stimulants but to a lesser degree than their tertiary amino analogs.

The tangible embodiments of this invention as described heretofore are those possessing a 4-phenyl-3,4-dihydroquinazoline nucleus. Where these are hydrogenated with lithium aluminum hydride, for example, the corresponding 1,2,3,4-tetrahydroquinazoline is obtained. These tetrahydro compounds exhibit essentially the same pharmacological properties as their 1,2-dihydro analogs, but apparently to a much lesser degree.

The 1,4-dihydro isomers of the tangible embodiments of this invention also are less active. These isomers are prepared in essentially the same manner but by utilizing an N-substituted-2-aminobenzhydrol in reaction with the nitrile, RCN. For example, reacting 2-methylaminobenzhydrol with acetonitrile as in Example 1 gives rise to 1,2-dimethyl-1,4-dihydroquinazoline, an isomer of the compound of Example 1. In view of the lesser activity of the isomers and the 1,2-dihydro analogs, the tangible embodiments of this invention are by and large the preferred class of compounds.

I claim:
1. A compound of the group consisting of 3,4-dihydroquinazolines having the following molecular structure:

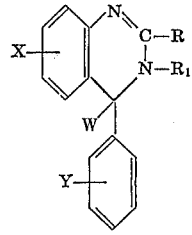

and the non-toxic pharmaceutically acceptable acid addition and lower alkyl halide quaternary salts thereof, wherein R is a member of the group consisting of lower alkyl, cyclopropyl, cyclobutyl, cyclopentyl, cyclohexyl, X-phenyl-lower alkyl, and lower alkoxy-methyl, $R_1$ is a member of the group consisting of lower alkyl, cyclopropyl, cyclobutyl, cyclopentyl, cyclohexyl, lower alkenyl, hydroxy lower alkyl, Y-phenyl-lower alkyl, and lower alkanol, W is a member of the group consisting of H and lower alkyl; and X and Y are members of the group consisting of H, halogen, trifluoromethyl, lower alkyl and lower alkoxy.

2. A compound of claim 1 wherein W, X, and Y are hydrogen, and F and $R_1$ are lower alkyl.

3. A compound of claim 1 wherein X is 6-chloro, W and Y are hydrogen, and R and $R_1$ are lower alkyl.

4. A compound of claim 2 wherein R and $R_1$ are each methyl.

5. A compound of claim 2 wherein R is methyl and $R_1$ is ethyl.

6. A compound of claim 3 wherein R and $R_1$ are each methyl.

7. A compound of claim 3 wherein R is methyl and $R_1$ is ethyl.

8. A compound of the group consisting of 3,4-dihydroquinazoline having the structural formula:

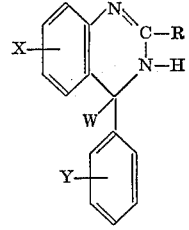

and the acid addition salts thereof, wherein R is a member of the group consisting of lower alkyl cyclopropyl, cyclobutyl, cyclopentyl, and cyclohexyl, X-phenyl-lower alkyl, and lower alkoxy-methyl, and chloromethyl, W is a member of the group consisting of H and lower alkyl; and X and Y are members of the group consisting of H, halogen, trifluoromethyl, lower alkyl and lower alkoxy.

References Cited

UNITED STATES PATENTS 3,322,764    5/1967    Metlesics et al. _____ 260—251

ALEX MAZEL, Primary Examiner

R. V. RUSH, Assistant Examiner

U.S. Cl. X.R.

424—251